(12) United States Patent
Minemura et al.

(10) Patent No.: US 12,066,111 B1
(45) Date of Patent: Aug. 20, 2024

(54) PISTON RING

(71) Applicant: TPR Co., Ltd., Tokyo (JP)

(72) Inventors: Satoshi Minemura, Tokyo (JP); Kenichiro Kosaka, Tokyo (JP); Yushi Abe, Tokyo (JP)

(73) Assignee: TPR Co., Ltd., Tokyo (JP)

( * ) Notice: Subject to any disclaimer, the term of this patent is extended or adjusted under 35 U.S.C. 154(b) by 0 days.

(21) Appl. No.: 18/566,852

(22) PCT Filed: Nov. 16, 2022

(86) PCT No.: PCT/JP2022/042599
§ 371 (c)(1),
(2) Date: Dec. 4, 2023

(87) PCT Pub. No.: WO2023/162369
PCT Pub. Date: Aug. 31, 2023

(30) Foreign Application Priority Data

Feb. 28, 2022 (JP) ................. 2022-030031

(51) Int. Cl.
*F16J 9/20* (2006.01)
*F16J 9/26* (2006.01)

(52) U.S. Cl.
CPC .. *F16J 9/20* (2013.01); *F16J 9/26* (2013.01)

(58) Field of Classification Search
CPC ...................................... F16J 9/20; F16J 9/26
See application file for complete search history.

(56) References Cited

U.S. PATENT DOCUMENTS

| 6,206,379 B1* | 3/2001 | Toshiaki .................. F16J 9/206 |
| | | 277/491 |
| 2004/0012153 A1 | 1/2004 | Yoshida et al. |
| 2010/0176557 A1 | 7/2010 | Peter-Klaus et al. |
| 2012/0205876 A1 | 8/2012 | Fujimura et al. |

(Continued)

FOREIGN PATENT DOCUMENTS

| CN | 204082367 U | 1/2015 |
| JP | 2003-113940 A | 4/2003 |
| JP | 2010-530045 A | 9/2010 |

(Continued)

OTHER PUBLICATIONS

Search Report and Written Opinion in International Application No. PCT/JP2022/042599 dated Jan. 24, 2023, 12 pages.

(Continued)

*Primary Examiner* — Gilbert Y Lee
(74) *Attorney, Agent, or Firm* — MARSHALL, GERSTEIN & BORUN LLP

(57) ABSTRACT

An outer peripheral surface of a piston ring has a cut surface provided to form a cutout portion between an outer peripheral end portion and a lower surface, the cut surface includes a curved concave surface, an inclination angle of a tangent of the curved concave surface at a point closest to the combustion chamber side on the curved concave surface, with respect to a first virtual line extending in parallel to the lower surface is equal to or greater than 5° and equal to or less than 50°, and in a case where an axial direction width of the piston ring is set as h1, and an axial direction width of the cut surface is set as H, H/h1 is equal to or greater than 0.2 and equal to or less than 0.4.

6 Claims, 13 Drawing Sheets

(56) References Cited

U.S. PATENT DOCUMENTS

2018/0017159 A1    1/2018   Fujita

FOREIGN PATENT DOCUMENTS

| | | |
|---|---|---|
| JP | 2020-193666 A | 12/2020 |
| JP | 2020-204349 A | 12/2020 |
| JP | 6924797 B2 | 8/2021 |
| WO | WO-2011/064888 A1 | 6/2011 |
| WO | WO-2016/121483 A1 | 8/2016 |

OTHER PUBLICATIONS

Extended European Search Report in EP Application No. 22928886.5 dated Jun. 10, 2024, 8 pages.

* cited by examiner

FIG. 13
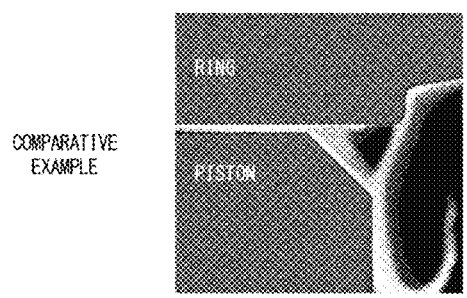
COMPARATIVE EXAMPLE
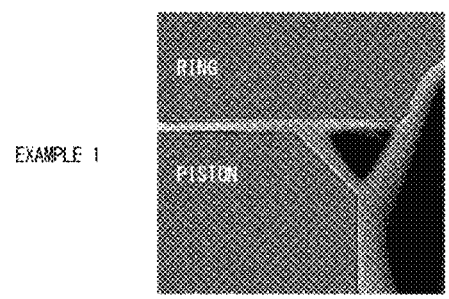
EXAMPLE 1
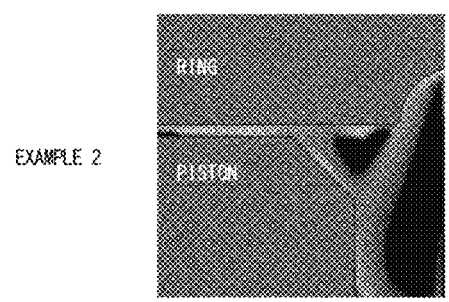
EXAMPLE 2
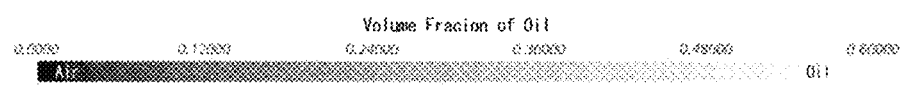

PISTON RING

TECHNICAL FIELD

The present invention relates to a piston ring.

BACKGROUND ART

An internal combustion (engine) to be mounted on a typical automobile employs a configuration in which three piston rings combining two compression rings including a top ring and a second ring and one oil ring are provided at a piston loaded to a cylinder. The top ring, the second ring and the oil ring of these three piston rings are loaded in ring grooves formed on an outer peripheral surface of the piston in this order from an upper side (a combustion chamber side) and slide on a cylinder inner wall surface. The oil ring farthest from the combustion chamber has an oil seal function of preventing oil from flowing out on the combustion chamber side (oil loss through piston) by scraping off extra engine oil (lubricant) attached on the cylinder inner wall surface on a crank side and a function of preventing burn-in of the piston in association with operation of the internal combustion by adjusting an oil amount so that a lubricant film is appropriately held on the cylinder inner wall surface. The compression ring has a gas seal function of preventing a combustion gas from flowing out on a crankcase side from the combustion chamber side (blow-by) by keeping airtightness and an oil seal function of preventing oil loss through piston by scraping off extra oil that cannot be scraped off by the oil ring. Such a combination of the piston rings is used to achieve reduction of a blow-by gas in the internal combustion and reduction of oil consumption. Further, it is known that by configuring the second ring as a scraper ring in which a stepwise cutout (undercut) is formed in a lower portion on an outer periphery side, oil scraping performance is improved (for example, Patent document 1).

CITATION LIST

Patent Document

[Patent document 1] Japanese Patent Laid-Open No. 2003-113940
[Patent document 2] Japanese Patent Laid-Open No. 2020-193666
[Patent document 3] WO 2016/121483

SUMMARY OF THE INVENTION

Technical Problem

However, in an internal combustion in which a piston ring having an undercut in related art is assembled, there is a case where in a descending stroke of a piston, part of oil on a cylinder inner wall flows on a surface of the undercut, thereby runs on a chamfered portion of a ring groove formed in the piston and flows between a lower surface of the piston ring and a lower wall surface of the ring groove. There is a possibility that an oil consumption amount may increase as a result of such oil flowing out on a combustion chamber side.

The present invention has been made in view of the above-described problems, and an object of the present invention is to provide a technique of enabling reduction in an oil consumption amount of an internal combustion in a piston ring having an undercut shape.

Solution to Problem

To solve the above-described problems, the present invention employs the following means. In other words, the present invention is a piston ring to be loaded to a piston of an internal combustion, the piston ring including an outer peripheral surface provided on an outer periphery of the piston ring, an inner peripheral surface provided on an inner periphery of the piston ring, an upper surface facing a combustion chamber side in the internal combustion among axial direction end surfaces of the piston ring, and a lower surface located on a crankcase side in the internal combustion among the axial direction end surfaces of the piston ring, in which the outer peripheral surface includes, on a cross-section orthogonal to a peripherally longitudinal direction of the piston ring, an outer peripheral end surface including an outer peripheral end portion that has a maximum diameter in the piston ring, and a cut surface that connects the outer peripheral end surface and the lower surface so as to form a cutout portion extending in the peripherally longitudinal direction of the piston ring between the outer peripheral end surface and the lower surface, the cut surface includes a curved concave surface curved in a concave shape so as to approach a central axis of the piston ring toward the crankcase side, and on the cross-section orthogonal to the peripherally longitudinal direction of the piston ring, an inclination angle of a tangent of the curved concave surface at a point located closest to the combustion chamber side on the curved concave surface, with respect to a first virtual line extending in parallel to the lower surface is equal to or greater than 5° and equal to or less than 50°, and in a case where an axial direction width of the piston ring is set as h1, and an axial direction width of the cut surface is set as H, H/h1 is equal to or greater than 0.2 and equal to or less than 0.4.

The piston ring according to the present invention has an outer peripheral surface which is a curved concave surface curved in a concave shape as described above. Thus, in a case where part of oil scraped off by the piston ring flows on the curved concave surface, the part of oil can be easily dropped on the crankcase side. This prevents oil from flowing between the lower surface of the piston ring and the lower wall surface of the ring groove.

Further, in the present invention, in a case where a length of the cut surface in a radial direction of the piston ring is set as D, D may be such that 0.2 mm≤D≤0.6 mm.

Further, in the present invention, on the cross-section orthogonal to the peripherally longitudinal direction of the piston ring, a curvature radius of the curved concave surface may be constant over the entire region of the curved concave surface.

Still further, in the present invention, a hard coating including at least one layer among a PVD processing coating, a DLC coating, a chrome plating processing coating, a nitridation processing coating, a chemical conversion processing coating, a resin coating, an oxidation processing coating, an Ni—P plating processing coating and a coated film may be formed on the outer peripheral surface.

Further, in the present invention, the cut surface further includes a lower R surface that connects the curved concave surface and the lower surface, and a curvature radius of the lower R surface is equal to or greater than 0.01 mm and equal to or less than 0.2 mm.

Further, in the present invention, in an internal combustion in which a plurality of compression rings are loaded to the piston, the piston ring may be formed as a second ring to be loaded at a second position from the combustion chamber side among the plurality of compression rings.

Advantageous Effects of Invention

According to the present invention, it is possible to further reduce an oil consumption amount of an internal combustion in a piston ring having an undercut shape.

BRIEF DESCRIPTION OF THE DRAWINGS

FIG. 13 is a view (3) indicating the analysis result of the oil flow distribution near the second ring of the internal combustion in the descending stroke of the piston.

DESCRIPTION OF EMBODIMENTS

An embodiment of the present invention will be described below with reference to the drawings. In the embodiment described below, the present invention is applied to a second ring as one example of a piston ring. The second ring is a compression ring loaded at a second position from a combustion chamber side among a plurality of compression rings in an internal combustion in which the plurality of compression rings are loaded to a piston. However, the piston ring according to the present invention is not limited to the second ring. The present invention may be applied to a top ring that is a compression ring to be loaded at a position closest to the combustion chamber or an oil ring to be loaded at a position farthest from the combustion chamber. Further, a configuration described in the following embodiment is not intended to limit a technical scope of the invention unless otherwise specified.

Note that in the following description, a "peripherally longitudinal direction" refers to a peripherally longitudinal direction of the piston ring unless otherwise specified. A "radial direction" refers to a radial direction of the piston ring unless otherwise specified. An "inner side in the radial direction" refers to an inner peripheral surface side of the piston ring, and an "outer side in the radial direction" refers to an opposite side of the inner side in the radial direction. An "axial direction" refers to a direction along a central axis of the piston ring unless otherwise specified. Further, an "upper wall surface" of a ring groove of the piston refers to an inner wall on the combustion chamber side among inner walls of the ring groove, and a "lower wall surface" refers to an inner wall on a crankcase side.

[Internal Combustion]

Figure 1:
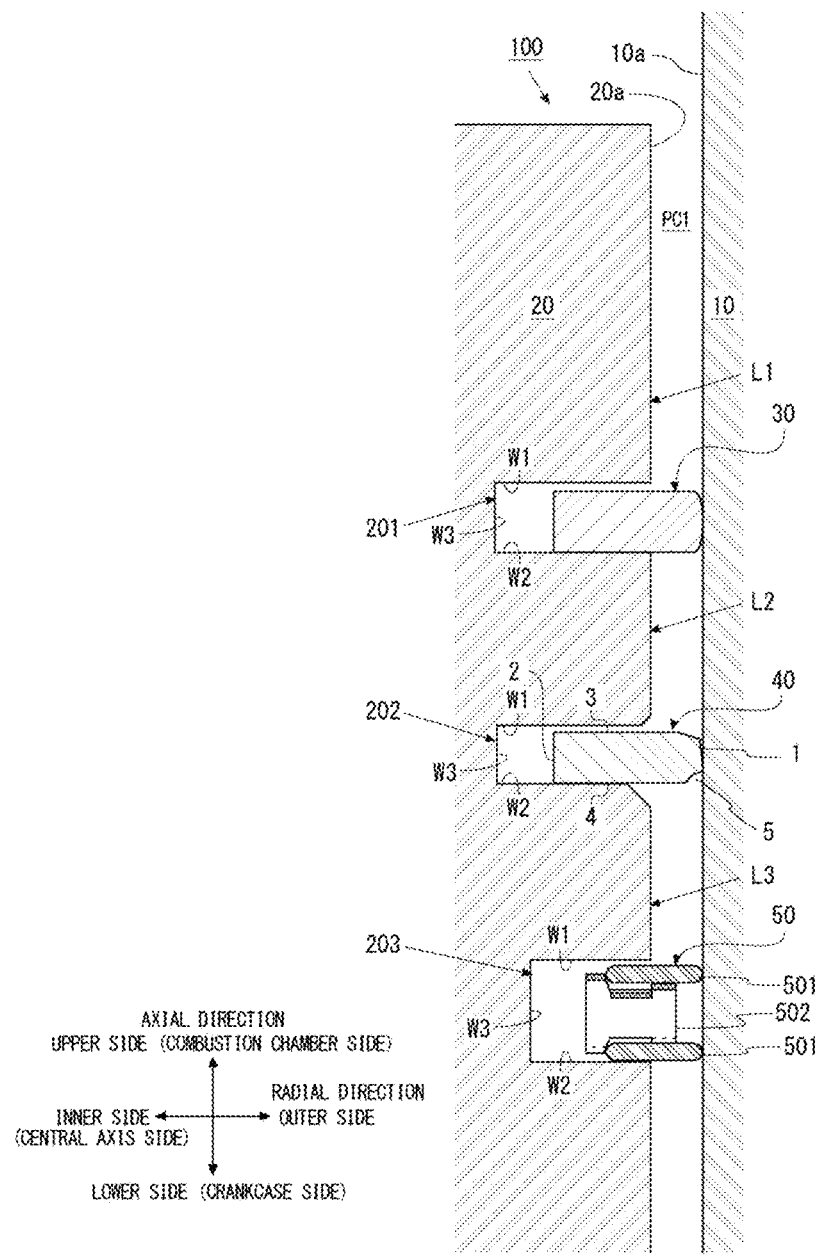
FIG. 1 is a cross-section view illustrating part of an internal combustion including a second ring according to an embodiment.

FIG. 1 is a cross-section view illustrating part of an internal combustion 100 including a second ring 40 according to the embodiment. FIG. 1 illustrates a cross-section along a central axis of a piston indicated with a reference numeral 20. As illustrated in FIG. 1, the internal combustion 100 according to a first embodiment includes a cylinder 10, the piston 20 loaded to (inserted into) the cylinder 10, and a plurality of piston rings 30, 40 and 50 loaded to the piston 20. In the internal combustion 100 according to the embodiment, two compression rings (a top ring 30 and the second ring 40) and one oil ring 50 are loaded to the piston 20. Between the two compression rings, the top ring 30 is loaded at a position closest to the combustion chamber, and the second ring 40 is loaded at a second position from the combustion chamber side. The oil ring 50 is loaded at a position farthest from the combustion chamber.

As illustrated in FIG. 1, in the internal combustion 100, a clearance PC1 is formed by securing a predetermined separation distance between an outer peripheral surface 20a of the piston 20 and an inner wall surface 10a of the cylinder 10. Further, on the outer peripheral surface 20a of the piston 20, a first ring groove 201, a second ring groove 202 and a third ring groove 203 are formed in this order from an upper side (combustion chamber side) at predetermined intervals in the axial direction of the piston 20. The ring grooves 201 to 203 are formed on the entire circumference of the outer peripheral surface 20a as a groove circularly extending about an axis of the piston 20. As illustrated in FIG. 1, each ring groove is formed to include a pair of groove walls (inner walls) disposed so as to vertically face each other. Between the pair of groove walls, the groove wall on the upper side is referred to as an upper wall surface W1, and the groove wall on the lower side is referred to as a lower wall surface W2. Further, a groove wall that connects an inner peripheral edge of the upper wall surface W1 and an inner peripheral edge of the lower wall surface W2 in each ring groove is referred to as a bottom wall surface W3. As illustrated in FIG. 1, the top ring 30 is loaded in the first ring groove 201, the second ring 40 is loaded in the second ring groove 202, and the oil ring 50 is loaded in the third ring groove 203. Further, by the ring grooves 201 to 203 being formed in the piston 20, a top land L1, a second land L2 and a third land L3 are defined in the piston 20 in this order from the combustion chamber side. Note that in the present specification, there is a case where a state in which each piston ring is loaded to the piston 20 as illustrated in FIG. 1 and the piston 20 is loaded to the cylinder 10 is referred to as a "use state".

The top ring 30 and the second ring 40 are compression rings that are one type of the piston ring, assembled to the piston loaded to the cylinder of the internal combustion and slide on the inner wall surface of the cylinder in association with reciprocating movement of the piston. The top ring 30 and the second ring 40 have self tension so as to press the inner wall surface 10a of the cylinder 10 in a case where the top ring 30 and the second ring 40 are loaded in the ring grooves. The oil ring 50 is a so-called three-piece type oil ring that is one type of the piston ring and includes a pair of segments 501, 501 that slide on the inner wall surface 10a of the cylinder 10 and a spacer expander 502 that biases these pair of segments 501, 501 outward (to the inner wall surface 10a side) in the radial direction. The second ring 40 that is one example of the piston ring according to the present invention will be described in detail below.

[Second Ring]

As illustrated in FIG. 1, the second ring 40 includes an outer peripheral surface 1, an inner peripheral surface 2, an upper surface 3 and a lower surface 4. The outer peripheral surface 1 is a surface provided on an outer periphery of the second ring 40. The inner peripheral surface 2 is a surface provided on an inner periphery of the second ring 40. The upper surface 3 is an end surface facing the upper side (combustion chamber side) in the internal combustion 100 among the axial direction end surfaces of 40. The lower surface 4 is an end surface facing the lower side (crankcase side) in the internal combustion 100 (in the use state) among the axial direction end surfaces of 40. A width in the axial direction of the second ring 40 (hereinafter, also referred to as an axial direction width) is defined by the upper surface 3 and the lower surface 4. In the second ring 40, the upper surface 3 faces the upper wall surface W1 of the second ring groove 202, the lower surface 4 faces the lower wall surface W2 of the second ring groove 202, the outer peripheral surface 1 slides on the inner wall surface 10a of the cylinder 10, and the inner peripheral surface 2 faces the bottom wall surface W3 of the second ring groove 202 in the use state. The second ring 40 has a circular shape in which an abutment (not illustrated) is formed. Further, the second ring 40 has self tension so that the outer peripheral surface 1 presses the inner wall surface 10a of the cylinder 10 in a case where the second ring 40 is loaded in the second ring groove 202. Further, as illustrated in FIG. 1, the second ring 40 has an undercut shape in which a cutout portion (undercut) indicated with a reference numeral 5 is formed in a lower portion on the outer periphery of the second ring 40. The cutout portion 5 extends in the peripherally longitudinal direction of the second ring 40 and is formed over the entire circumference of the second ring 40. In the use state, the cutout portion 5 becomes an oil pan, and when the second ring 40 scrapes off oil in the clearance PC1 upon descending of the piston 20, the oil is buffered in the cutout portion 5, thereby rise in a hydraulic pressure is prevented. This results in achieving favorable oil scraping performance. Note that the cutout portion 5 does not have to be formed over the entire circumference of the second ring 40, and, for example, the cutout portion 5 does not have to be formed in the vicinity of an abutment portion. In other words, the cutout portion 5 may be formed in the second ring 40 except an end portion of the abutment that forms the abutment portion. This can improve gas seal performance.

Figure 2:
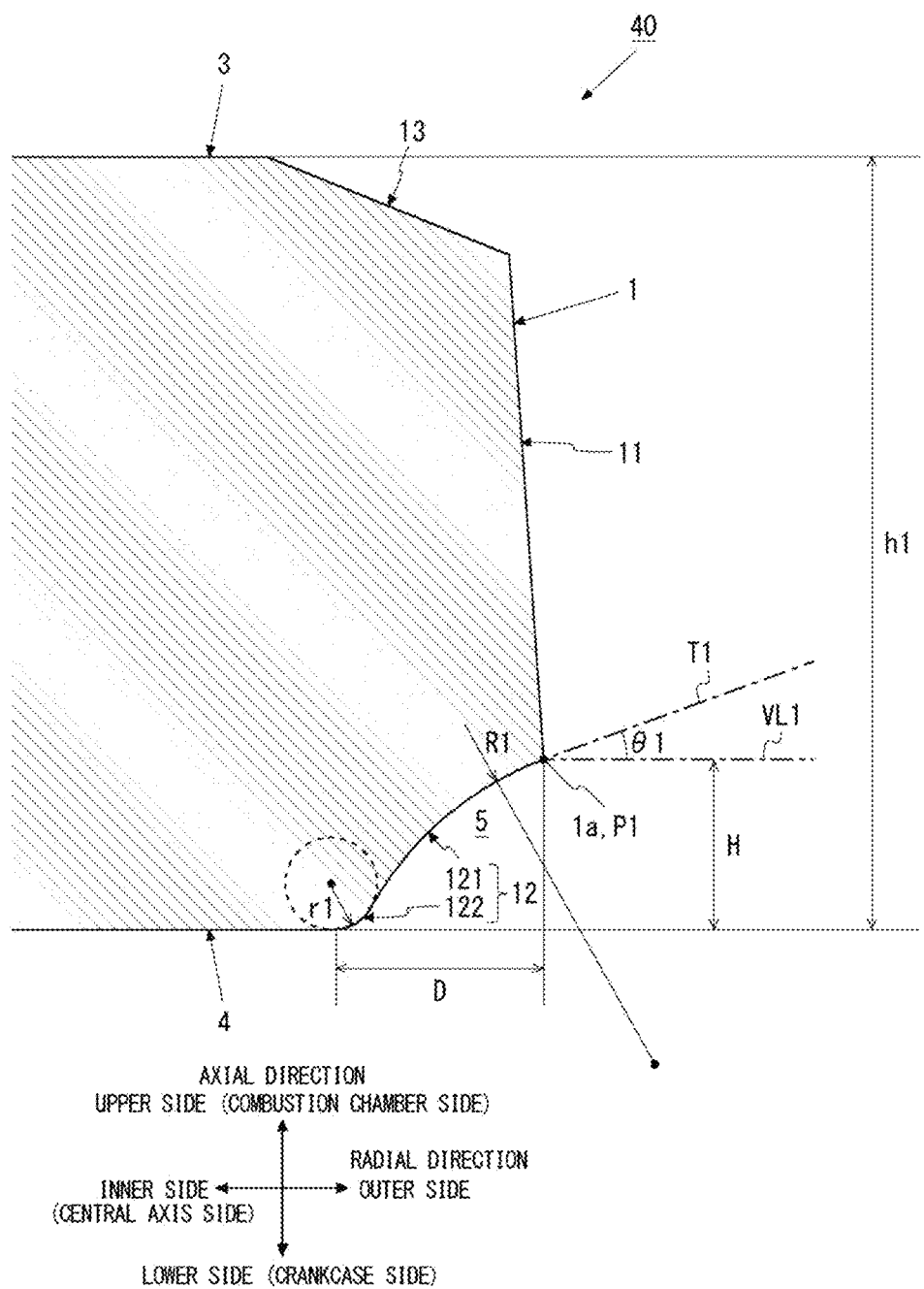
FIG. 2 is a cross-section view for describing an outer peripheral surface of the second ring according to the embodiment.

FIG. 2 is a cross-section view for describing the outer peripheral surface 1 of the second ring 40 according to the embodiment. FIG. 2 illustrates part of the cross-section orthogonal to the peripherally longitudinal direction of the second ring 40. As illustrated in FIG. 2, the outer peripheral surface 1 of the second ring 40 includes a tapered surface 11, a cut surface 12 and a connection surface 13.

As illustrated in FIG. 2, the tapered surface 11 is a surface including an outer peripheral end portion 1a indicated with a reference numeral 1a and sliding on the inner wall surface 10a of the cylinder 10 in the internal combustion 100. The outer peripheral end portion 1a is a portion that has a maximum diameter in the second ring 40 on the cross-section orthogonal to the peripherally longitudinal direction of the second ring 40. While the outer peripheral end portion 1a illustrated in FIG. 2 is formed as an edge, the outer peripheral end portion 1a may be formed as a rounded surface. The tapered surface 11 is inclined so as to approach a central axis of the second ring 40 (that is, the diameter is reduced) toward the upper side (combustion chamber side) from the outer peripheral end portion 1a using the outer peripheral end portion 1a as a lower edge. By this means, an outer peripheral shape of the second ring 40 according to the embodiment has a tapered undercut shape. The tapered surface 11 corresponds to the "outer peripheral end surface" according to the present invention. Note that the outer peripheral end surface according to the present invention may be a straight surface with a uniform outer diameter regardless of a position in the axial direction. In this case, the whole of the straight surface becomes the outer peripheral end portion. Further, the outer peripheral end surface according to the present invention may have a barrel shape curved so as to be convex outward in the radial direction. In this case, a peak of the barrel shape becomes the outer peripheral end portion, and an undercut is formed downward from the peak.

As illustrated in FIG. 2, the connection surface 13 connects an upper edge of the tapered surface 11 and an outer peripheral edge of the upper surface 3. Note that in the present invention, the connection surface 13 is not an essential component.

As illustrated in FIG. 2, the cut surface 12 is provided to form the cutout portion 5 between the tapered surface 11 and the lower surface 4 and connects the tapered surface 11 and the lower surface 4. The cut surface 12 includes a curved concave surface 121 and a lower R surface 122. As illustrated in FIG. 2, the curved concave surface 121 is curved in a concave shape so as to approach the central axis of the second ring 40 toward the lower side (crankcase side). Here, a curvature radius of the curved concave surface 121 is set as R1. As illustrated in FIG. 2, on the cross-section orthogonal to the peripherally longitudinal direction of the second ring 40, the curved concave surface 121 forms a curve that is convex upward. More specifically, the curved concave surface 121 according to the embodiment is formed in an arc shape, and the curvature radius R1 thereof is constant in the entire region of the curved concave surface 121. In other words, the curved concave surface 121 according to the embodiment is formed with a single arc whose curvature does not change. However, a shape of the curved concave surface in the present invention is not limited to this. The curved concave surface may be formed so that the curvature changes. As illustrated in FIG. 2, an upper edge of the curved concave surface 121 is connected to the outer peripheral end portion 1a. Note that another surface (for example, an R surface) may be interposed between the curved concave surface 121 and the outer peripheral end portion 1a. A reference numeral P1 in FIG. 2 indicates a point located on the uppermost side on the curved concave surface 121 on the cross-section orthogonal to the peripherally longitudinal direction of the second ring 40. In the present embodiment, the upper edge of the curved concave surface 121 is connected to the outer peripheral end portion 1a, and thus, the point P1 coincides with the outer peripheral end portion 1a.

As illustrated in FIG. 2, the lower R surface 122 connects a lower edge of the curved concave surface 121 and an outer peripheral edge of the lower surface 4. The lower R surface 122 is a so-called corner R formed through chamfering processing and is formed in an arc shape so as to be convex on the cross-section orthogonal to the peripherally longitudinal direction of the second ring 40. As illustrated in FIG. 2, a curvature radius of the lower R surface 122 is set as r1. Note that in the present invention, the lower R surface 122 is not an essential component.

Here, as illustrated in FIG. 2, on the cross-section orthogonal to the peripherally longitudinal direction of the second ring 40, a virtual line extending outward in the radial direction from the point P1 in parallel to the lower surface 4 is set as a first virtual line VL1. Further, a reference numeral T1 in FIG. 2 indicates a tangent of the curved concave surface 121 at the point P1 on the cross-section orthogonal to the peripherally longitudinal direction of the second ring 40. In this event, an inclination angle of the tangent T1 with respect to the first virtual line VL1 is set as θ1. Further, an axial direction width of the second ring 40 is set as h1, an axial direction width of the cut surface 12 (that is, the width of the cutout portion 5) is set as H. Still further, a length of the cut surface 12 (that is, a depth of the cutout portion 5) in the radial direction of the second ring 40 is set as D. In this event, in the second ring 40 according to the embodiment, θ1 is set so that $5° \leq θ1 \leq 50°$. Further, in the second ring 40, h1 and H are set so that $0.2 \leq H/h1 \leq 0.4$. Note that while a range of h1 is not particularly limited, for example, the range of h1 is preferably set so that 0.8 mm≤h1≤equal to or less than 2.5 mm.

[Oil Seal Performance]

Figure 3:
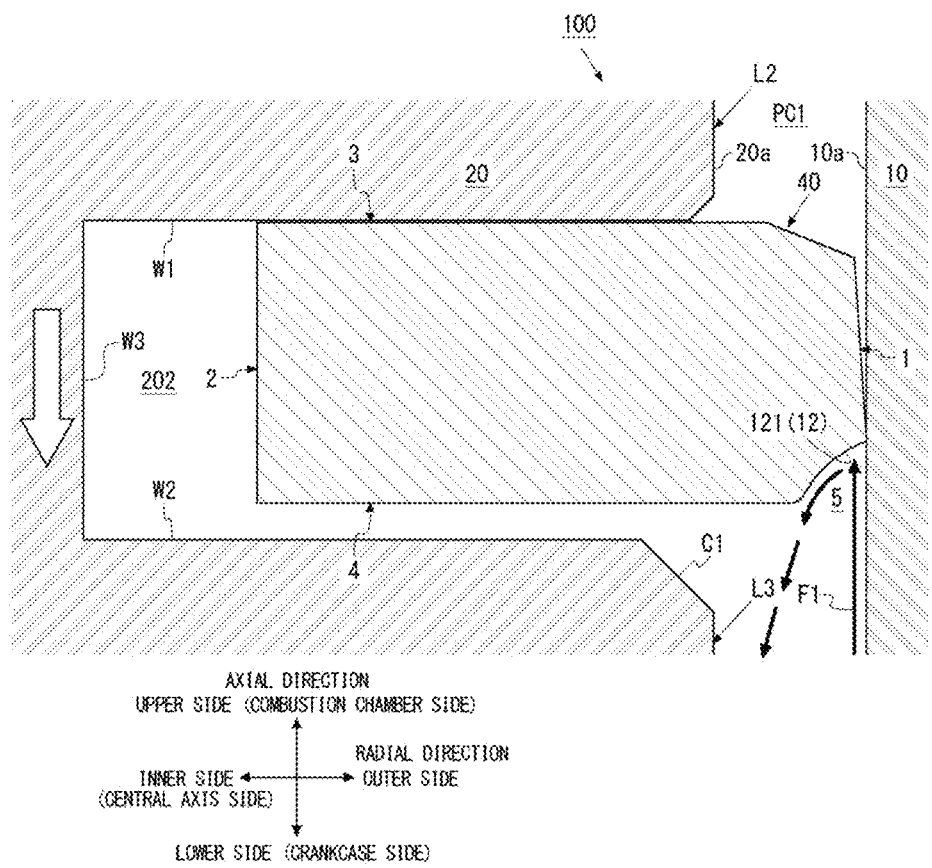
FIG. 3 is a cross-section view of a portion near the second ring when a piston is in a descending stroke in the internal combustion according to the embodiment.
Figure 4:
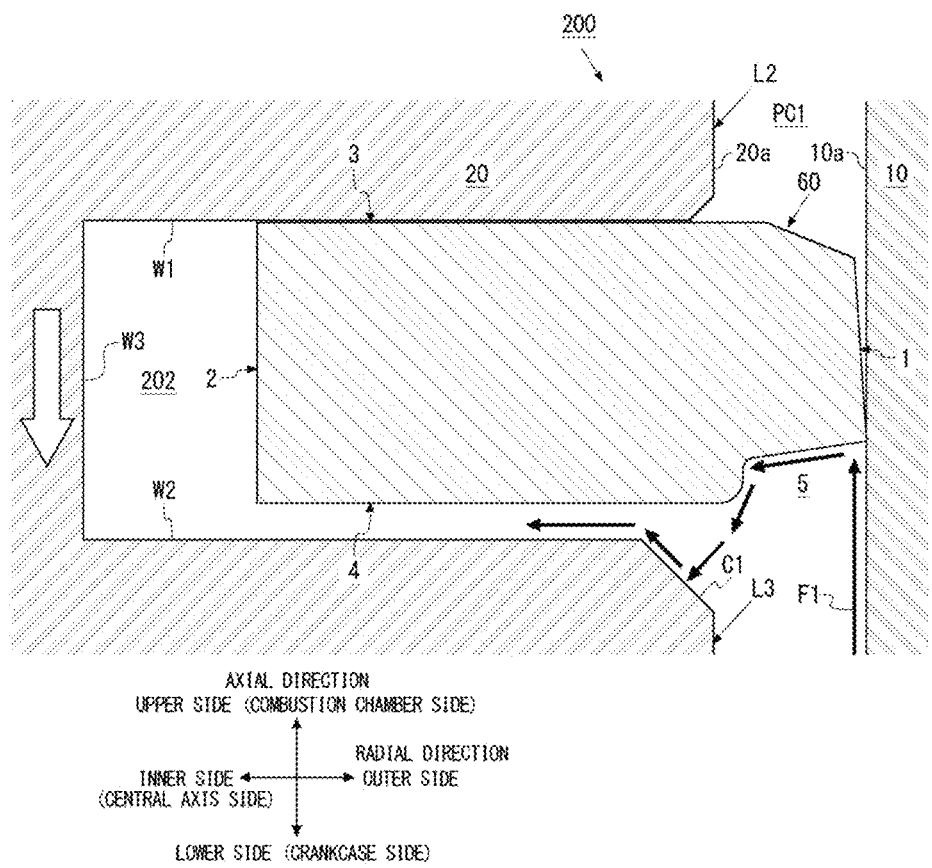
FIG. 4 is a cross-section view of a portion near a second ring when a piston is in a descending stroke in an internal combustion according to a comparative example.

Oil scraping performance of the second ring 40 according to the embodiment will be described below. FIG. 3 is a cross-section view of a portion near the second ring 40 when the piston 20 is in a descending stroke in the internal combustion 100 according to the embodiment. FIG. 4 is a cross-section view of a portion near the second ring 60 when the piston 20 is in a descending stroke in an internal combustion 200 according to a comparative example. FIG. 3 and FIG. 4 illustrate cross-sections along the central axis of the piston 20. The internal combustion 200 according to the comparative example illustrated in FIG. 4 is different from the internal combustion 100 according to the embodiment in that in place of the second ring 40 according to the embodiment, a second ring 60 having a tapered undercut shape in related art is loaded in the second ring groove 202 of the piston 20. Here, a reference numeral F1 in FIG. 3 and FIG. 4 represents flow of part of oil present on the inner wall surface 10a of the cylinder 10, relative to the piston 20. Further, a reference numeral C1 indicates a chamfered portion formed between the lower wall surface W2 of the second ring groove 202 and the outer peripheral surface 20a of the piston 20.

As illustrated in FIG. 4, there is a case where in the internal combustion 200 according to the comparative example, part of oil scraped off by the second ring 60 flows on a surface of the undercut. In this case, there is a possibility that the part of oil hits against the chamfered portion C1 of the second ring groove 202 without dropping in the clearance PC1 and flows between the lower surface 4 of the second ring 60 and the lower wall surface W2 of the second ring groove 202. Thus, in the comparative example, there is a possibility that part of oil flowing between the lower surface 4 of the second ring 60 and the lower wall surface W2 of the second ring groove 202 passes through a ring back side (more specifically, on the inner periphery side of the second ring 60) and flows out on the combustion chamber side, thereby an oil consumption amount increases.

In contrast, in the internal combustion 100 according to the embodiment, the outer peripheral surface 1 of the second ring 40 includes the curved concave surface 121 curved in a concave shape as described above. Thus, as illustrated in FIG. 3, in a case where part of oil scraped off by the second ring 40 flows on the curved concave surface 121, the part of oil can be easily dropped in the clearance PC1 in the third land L3 by being dispersed. This prevents oil from flowing between the lower surface 4 of the second ring 40 and the lower wall surface W2 of the second ring groove 202.

[Operation/Effects]

As described above, the cut surface 12 that forms the cutout portion 5 in the second ring 40 according to the embodiment includes the curved concave surface curved in a concave shape so as to approach the central axis of the second ring 40 toward the lower side. Further, in the second ring 40 according to the embodiment, the inclination angle θ1 of the tangent T1 with respect to the first virtual line VL1 is equal to or greater than 5° and equal to or less than 50°, and H/h1 is equal to or greater than 0.2 and equal to or less than 0.4. As a result of the second ring 40 according to the embodiment being configured as described above, it is possible to improve oil seal performance and reduce an oil consumption amount of the internal combustion 100.

Here, if the length D of the cut surface is too long, an amount of oil that hits against the chamfered portion of the piston increases, which increases an amount of oil outflow to the ring lower surface (between the lower surface of the piston ring and the lower wall surface of the ring groove). In a case where θ1 is less than 5°, to prevent the length D of the cut surface from becoming too long while securing a volume of the undercut portion (cutout portion 5), it is necessary to make the axial direction width H of the cut surface small and make the curvature radius R1 of the curved concave surface small. By making R1 small, force of oil flowing toward the crankcase side is weakened. This results in increasing oil running on the chamfered portion of the piston and increasing oil outflow on the ring lower surface (see FIG. 10). In a case where θ1 is equal to or greater than 50°, it is necessary to make the axial direction width H of the cut surface high to form the curved concave surface while securing a volume of the undercut portion (cutout portion 5), and it is necessary to make the length D of the cut surface 12 short. If the length D of the cut surface is made short, vortex of oil is generated, which increases an amount of oil running on the chamfered portion of the piston and thus increases outflow of oil on the ring lower surface. As described above, in the case where θ1 is less than 5° or in the case where θ1 exceeds 50°, a dimension of the undercut portion (cutout portion 5) is limited, and thus, shape design is constrained. Further, in a case where H/h1 is less than 0.2, space of the undercut portion (cutout portion 5) is narrowed, and oil flows out between the lower surface of the piston ring and the lower wall surface of the ring groove at early stage (see FIG. 11). Further, in a case where H/h1 is greater than 0.4, space of the undercut portion becomes wide, oil whirls in the undercut portion, and vortex is generated. Dispersion of oil is prevented by the generated vortex, and oil to be dropped (to be let out) in a clearance in the third land decreases (see FIG. 12). Note that θ1 is preferably set so that $5° \leq θ1 \leq 40°$, and more preferably set so that $5° \leq θ1 \leq 30°$. Further, H/h1 is more preferably set so that $0.2 \leq H/h1 \leq 0.3$.

Note that in terms of improvement of oil seal performance, the curvature radius r1 of the lower R surface is preferably set so that $0.01$ mm≤ $r1 \leq 0.2$ mm, and more preferably set so that $0.05$ mm≤r1≤0.2 mm. Further, in similar terms, D is preferably set so that 0.2 mm≤D≤0.6 mm, and more preferably set so that 0.2 mm≤D≤0.5 mm. Further, in similar terms, H is more preferably set so that 0.2 mm≤H≤0.6 mm. However, the present invention is not limited to these numerical values. In a case where a hard coating is present on the outer peripheral surface 1, in a case where r1 is less than 0.01 mm, there is a possibility that a crack is generated at a corner portion of the coating when the lower surface 4 of the second ring 40 is subjected to grinding processing. In a case where r1 is greater than 0.2 mm, a proportion of the curved concave surface 121 in the whole of the cut surface 12 decreases. It is considered that this reduces dispersion force of the curved concave surface 121, increases oil flowing on the ring lower surface and oil running on the chamfered portion of the piston (oil is guided on the ring lower surface by increase of r1), and reduces oil dropped on the crankcase side.

Further, in the second ring 40 according to the embodiment, the curvature radius is constant over the entire region on the curved concave surface 121 on the cross-section orthogonal to the peripherally longitudinal direction. For example, in a case where a vapor-deposited film is formed on the surface of the piston ring using a vapor deposition method using a target such as a physical vapor deposition (PVD) method, if there is a portion whose curvature changes on the target surface, particles that become a material of the vapor-deposited film hardly sufficiently collide with each other, and there is a case where a film thickness of the vapor-deposited film becomes non-uniform. For example, the curvature radius of the surface of the undercut of the second ring 60 according to the comparative example is not constant, and thus, the film thickness of the vapor-deposited film is likely to be non-uniform. If the film thickness of the vapor-deposited film is non-uniform, a processing liquid penetrates between a substrate surface and the vapor-deposited film from a portion where the vapor-deposited film is thin during chemical conversion processing in the post-process, which may lead to peeling of the vapor-deposited film in work of assembling the piston ring to the engine. The peeled vapor-deposited film becomes a foreign matter and becomes a factor of generating a scar on the cylinder inner wall during operation of the internal combustion. To address such a problem, in the second ring 40 according to the embodiment, the curvature radius is constant over the entire region of the curved concave surface 121, so that a vapor-deposited film with high uniformity of the film thickness can be formed with respect to the curved concave surface 121. This can achieve favorable adhesion property of the vapor-deposited film and prevent floating and peeling of the vapor-deposited film.

Modification

Figure 5:
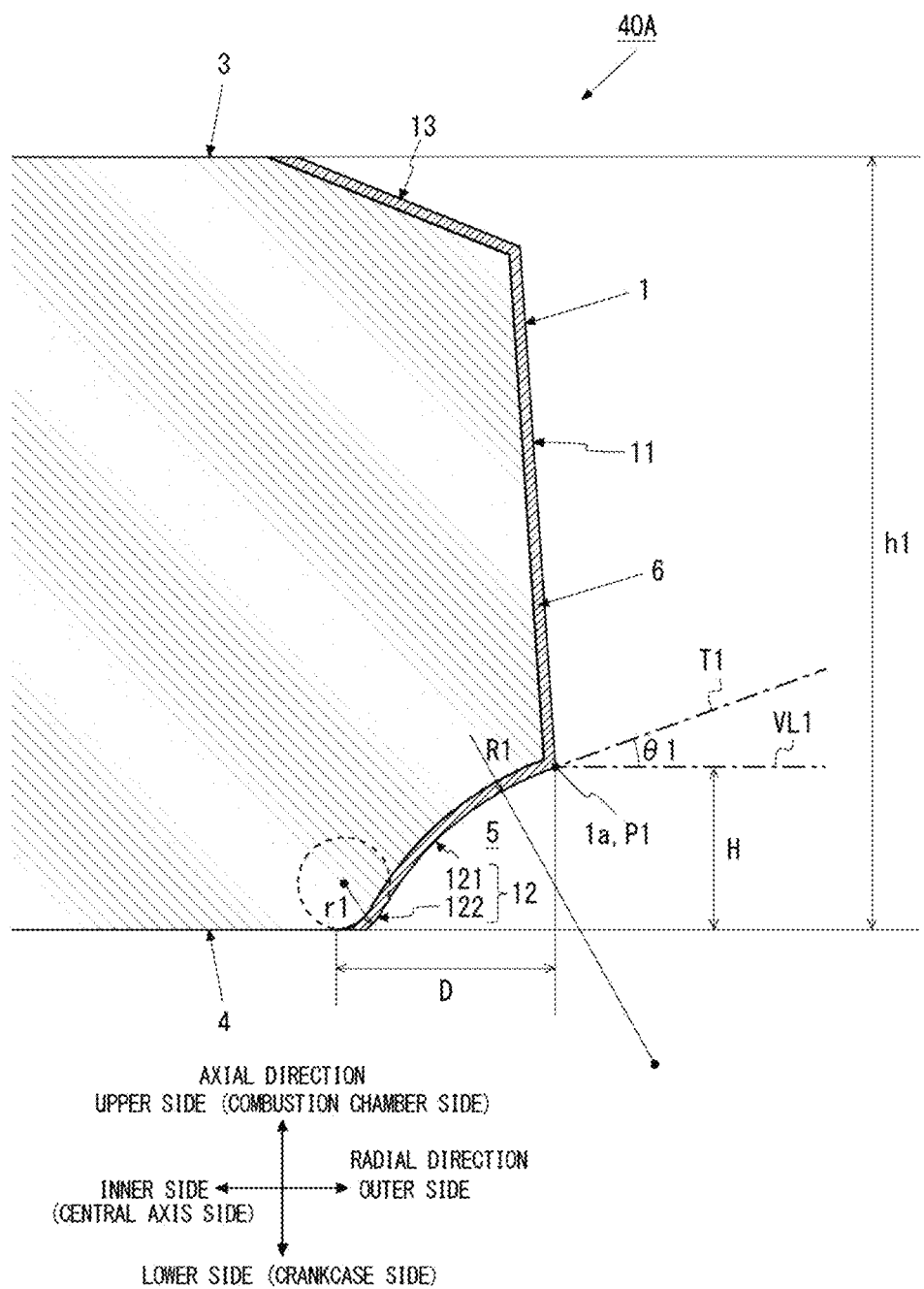
FIG. 5 is a cross-section view for describing an outer peripheral surface of a second ring according to a modification of the embodiment.

FIG. 5 is a cross-section view for describing the outer peripheral surface 1 of a second ring 40A according to a modification of the embodiment. FIG. 5 illustrates part of the cross-section orthogonal to the peripherally longitudinal direction of the second ring 40A. As illustrated in FIG. 5, the second ring 40A is different from the second ring 40 described above in that a hard coating indicated with a reference numeral 6 is formed on the outer peripheral surface 1. In the second ring 40A according to the modification, the outer peripheral surface 1 is constituted with the hard coating 6.

The hard coating 6 is formed as a coating including at least one layer among a PVD processing coating, a DLC coating, a chrome plating processing coating, a nitridation processing coating, a chemical conversion processing coating, a resin coating, an oxidation processing coating, an Ni—P plating processing coating and a coated film. Note that the "physical vapor deposition (PVD) processing coating" refers to a coating formed using the PVD method. Note that the PVD method is one type of the vapor deposition method for forming a film on a surface of a substrate by attaching particles of a film material emitted from a target formed including the film material to the substrate and is also referred to as physical vapor deposition. The PVD method can include an ion plating method, a vacuum vapor deposition method, an ion beam vapor deposition method, a sputtering method, a filtered cathodic vacuum arc (FCVA) method, and the like. Further, the "diamond like carbon (DLC) coating" refers to an amorphous hard carbon coating mainly constituted with allotropes of carbon hydride and carbon. Further, the "chrome plating processing coating" refers to a coating formed through chrome plating. The chrome plating is also referred to as industrial chrome plating. The "nitridation processing coating" refers to a coating formed by causing nitride to penetrate a metal surface through nitridation processing. The "chemical conversion processing coating" refers to a coating formed through chemical conversion processing. Examples of the chemical conversion processing can include triiron tetraoxide processing (black oxide processing), phosphate processing, chromate processing, and the like. Further, examples of the chromate processing can include manganese phosphate processing, zinc phosphate processing, iron phosphate processing, and the like. Further, the "resin coating" refers to a coating formed using a resin material. The "oxidation processing coating" refers to a coating formed by oxidizing a metal surface through oxidation processing. Examples of the oxidation processing can include alumite processing, and the like. The "Ni—P plating processing coating" refers to a coating formed through electroless Ni—P plating. Note that the "coated film" refers to a film formed through application of a paint (coating material). Examples of the "coated film" and the "resin coating" can include a resin coated film using an aqueous or oil-based resin paint. By forming such a hard coating, abrasion resistance of the upper and lower surfaces of the segment can be improved. Examples of the hard coating 6 can include, for example, a Cr nitride coating (such as a Cr—N film and a Cr—B—N film) and an amorphous carbon coating. However, the hard coating according to the present invention is not limited to these. According to the modification 1, by forming the hard coating 6 on the outer peripheral surface 1, abrasion resistance of the outer peripheral surface 1 can be improved.

<Evaluation of Adhesion Property>

Figure 6:
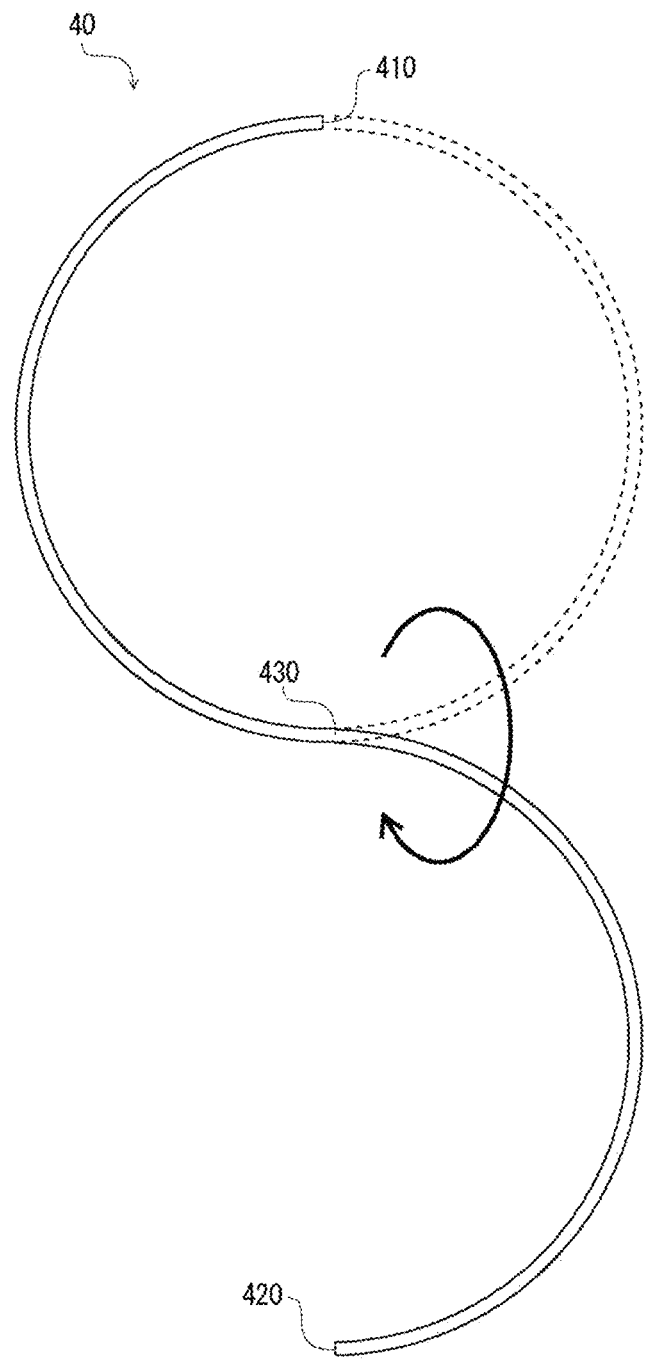
FIG. 6 is a view for describing a torsion test.

Adhesion property of the PVD coating formed on the second ring according to the embodiment was evaluated. In the evaluation of the adhesion property, a torsion test was performed on the second ring after an oxide coating was formed through chemical conversion processing, and whether or not peeling of the PVD coating is present on the cut surface was visually observed. FIG. 6 is a view for describing the torsion test. In the torsion test, as illustrated in FIG. 6, a pair of abutment end portions 410, 420 that form the abutment of the second ring 40 were gripped, and the second ring was twisted at a predetermined torsion angle in a direction in which the second ring has a posture indicated with a solid line in FIG. 6 using an opposite side portion 430 of the abutment with respect to the central axis as a supporting point. Note that the torsion angle in this event was set at 180°.

EXAMPLE

As an example, adhesion property in a case where the PVD coating was formed as a hard coating on the outer peripheral surface 1 of the second ring 40 according to the embodiment illustrated in FIG. 2 was evaluated.

Comparative Example

As a comparative example 1, adhesion property in a case where the PVD coating was formed as the hard coating 6 on the outer peripheral surface 1 of the second ring 60 according to the comparative example illustrated in FIG. 4 was evaluated.

Experimental Results

Evaluation results indicated in Table 1 indicate results of evaluation of adhesion property based on the following evaluation standards. In the evaluation standards, when occurrence of peeling of the PVD coating was not confirmed, the result is indicated as "○", and when occurrence of peeling was confirmed, the result is indicated as "x". As indicated in Table 1, better adhesion property was obtained in the example than in the comparative example. It could be confirmed from this that adhesion property of the PVD coating was improved by a surface processing method according to the first embodiment.

TABLE 1

|  | Occurrence of peeling | Evaluation of adhesion property |
|---|---|---|
| Comparative example | Yes | x |
| Example | No | ○ |

<Evaluation of Oil Seal Performance>

Oil seal performance of the second ring according to the embodiment was evaluated through analysis using analysis software. In the evaluation of the seal performance, an amount of oil outflow in the descending stroke of the piston in the internal combustion was analyzed.

Comparative Evaluation

As examples 1 and 2, oil seal performance of the second ring 40 according to the embodiment illustrated in FIG. 2 was evaluated. In the example 1, the second ring in which h1=1.48 mm, H=0.42 mm, D=0.3 mm and θ1=20° was used. In the example 2, the second ring in which h1=1.48 mm, H=0.36 mm, D=0.31 mm, θ1=8° was used. As the comparative example, oil seal performance of the second ring 60 according to the comparative example illustrated in FIG. 4 was evaluated.

Comparative Results

Figure 7:
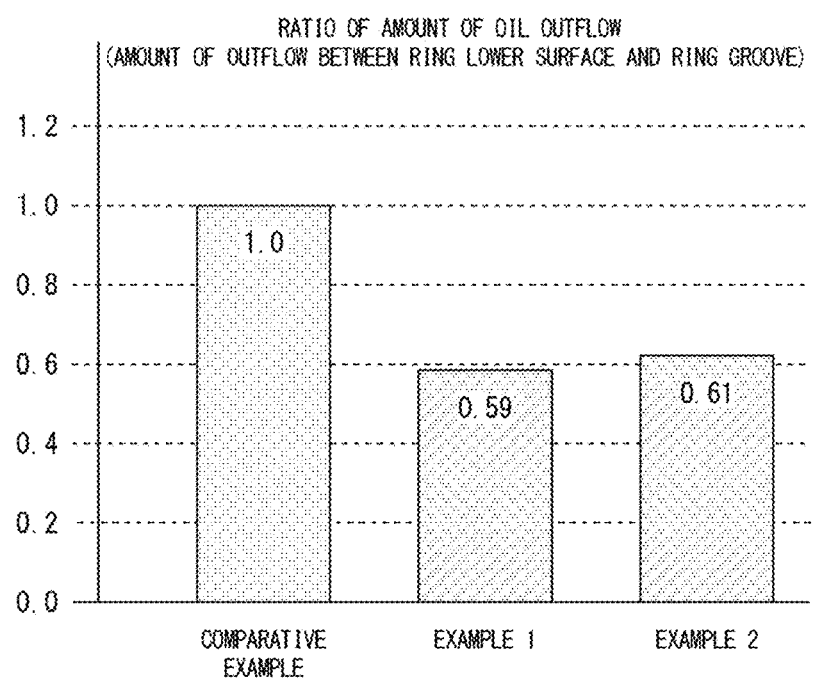
FIG. 7 is a graph indicating a ratio of an amount of oil outflow in an example with respect to the comparative example.

FIG. 7 is a graph indicating a ratio of an amount of oil outflow in the example with respect to the comparative example. The ratio of the amount of oil outflow indicated on a vertical axis in FIG. 7 is a ratio of an amount of oil flowing out between the lower surface of the second ring and the lower wall surface of the ring groove. As indicated in FIG. 7, the ratio of the amount of oil flowing out between the lower surface of the second ring and the lower wall surface of the ring groove in the example 1 with respect to the comparative example was 0.59. Further, the ratio of the amount of oil outflow in the example 2 with respect to the comparative example was 0.61. It could be seen from the analysis result in FIG. 7 that the amount of oil flowing out between the lower surface of the second ring and the lower wall surface of the ring groove was reduced in the examples 1 and 2 compared to the comparative example.

[Parameter Evaluation]

Figure 8:
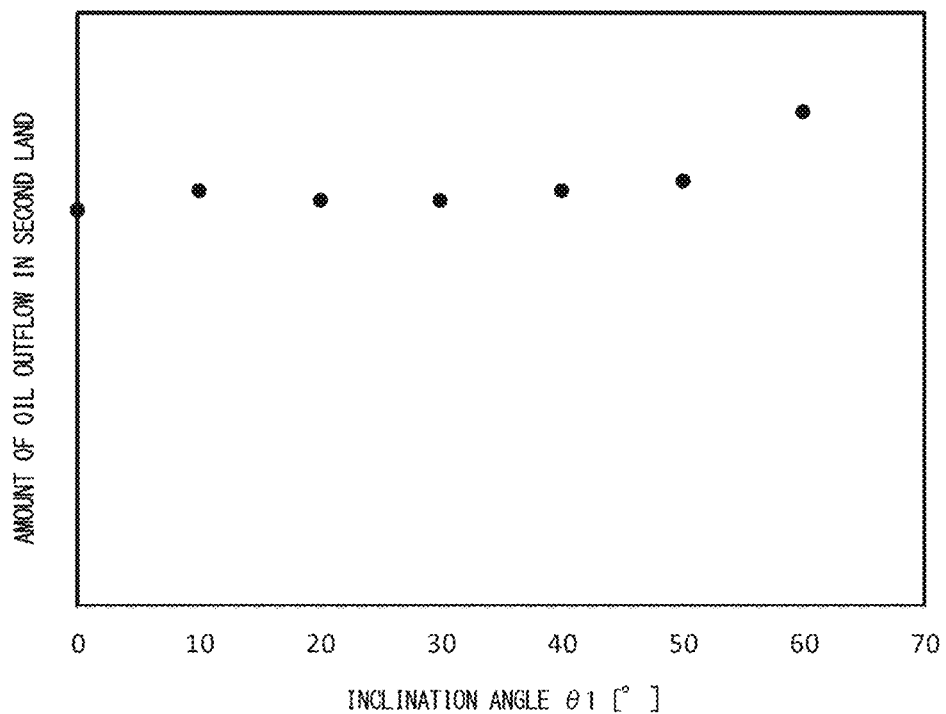
FIG. 8 is a graph indicating a relationship between θ1 and an amount of oil outflow.
Figure 9:
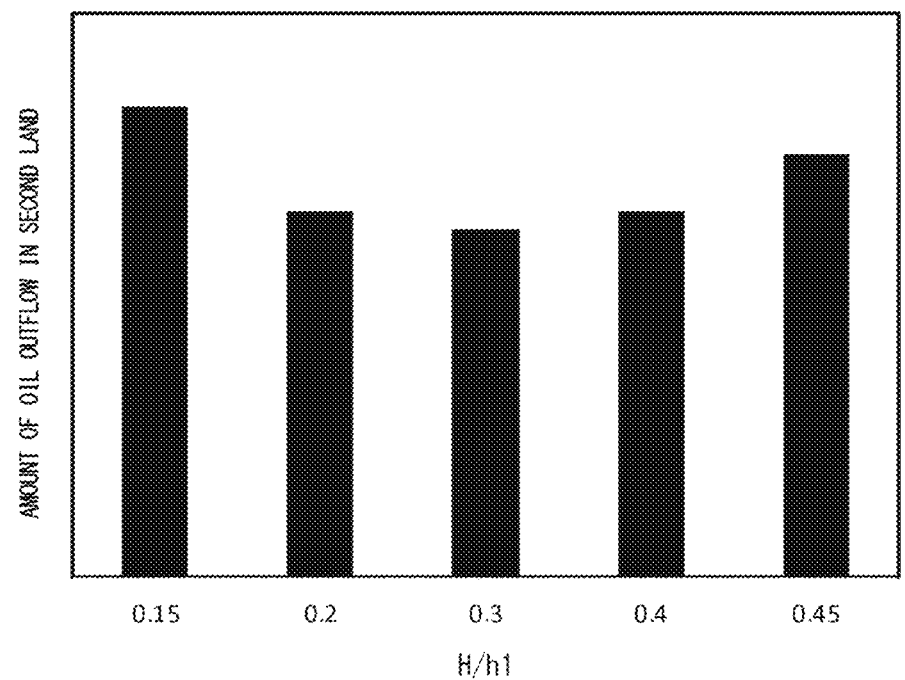
FIG. 9 is a graph indicating a relationship between H/h1 and the amount of oil outflow.
Figure 10:
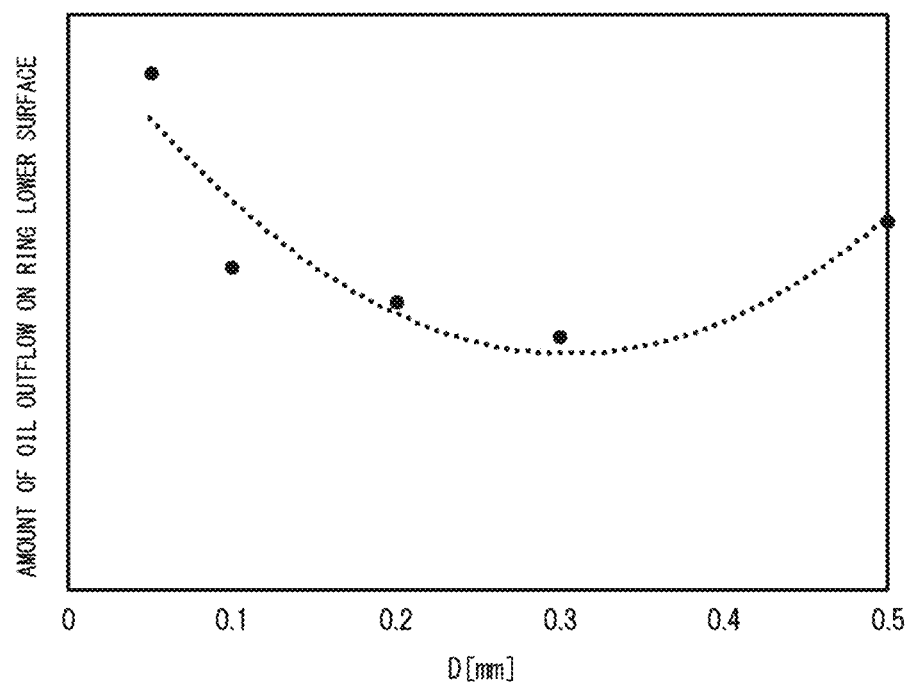
FIG. 10 is a graph indicating a relationship between D and the amount of oil outflow.

FIG. 8 is a graph indicating a relationship between θ1 and the amount of oil outflow. FIG. 8 indicates a relationship between θ1 and the amount of oil outflow in a case where θ1=0°, 10°, 20°, 30°, 40°, 50°, and 60° in the second ring according to the embodiment. Further, FIG. 9 is a graph indicating a relationship between H/h1 and the amount of oil outflow. FIG. 9 indicates a relationship between H/h1 and the amount of oil outflow in a case where H/h1=0.15, 0.2, 0.3, 0.4 and 0.45 in the second ring according to the embodiment. The amount of oil outflow indicated on a vertical axis in FIG. 8 and FIG. 9 is an amount of oil passing through between the outer peripheral surface of the second ring and the inner wall surface of the cylinder and flowing out to the second land. Further, FIG. 10 is a graph indicating a relationship between D and the amount of oil outflow. FIG. 10 indicates a relationship between D and the amount of oil outflow in a case where D=0.05 mm, 0.1 mm, 0.2 mm, 0.3 mm, and 0.5 mm in the second ring according to the embodiment. The amount of oil outflow indicated on a vertical axis in FIG. 10 is an amount of oil flowing out between the lower surface of the second ring and the lower wall surface of the ring groove. As indicated in FIG. 8, it can be seen that the amount of oil outflow to the second land is relatively smaller in a case where θ1=0°, 10°, 20°, 30°, 40° and 50° than in a case where θ1=60°. It could be seen from this that the amount of oil outflow to the second land was reduced by setting θ1 at equal to or less than 50°. Further, as indicated in FIG. 9, it can be seen that the amount of oil outflow to the second land is relatively smaller in a case where H/h1=0.2, 0.3 and 0.4 than in a case where H/h1=0.15 and 0.45. It could be seen from this that the amount of oil outflow to the second land was reduced by setting H/h1 at equal to or greater than 0.2 and equal to or less than 0.4. Further, as indicated in FIG. 10, it could be seen that the amount of oil outflow between the lower surface of the second ring and the lower wall surface of the ring groove was reduced in a range of 0.2 mm≤D≤0.5 mm. Particularly, it can be seen that the amount of oil outflow is the smallest when D is near 0.3 mm. In other words, the amount of oil outflow increases as D becomes smaller in a range of D<0.3 mm. It can be considered that this is because vortex of oil is generated by oil on the inner wall surface of the cylinder interfering with oil in the undercut portion (cutout portion) of the ring and oil whose flow velocity is reduced flows along the ring lower surface. Further, in the range of D>0.3 mm, the amount of oil outflow increases as D becomes greater. It can be considered that this is because the amount of oil flowing along the ring lower surface increases as a result of the amount of oil hitting against the chamfered portion of the piston increasing.

<Flow Distribution Evaluation>

Figure 11:
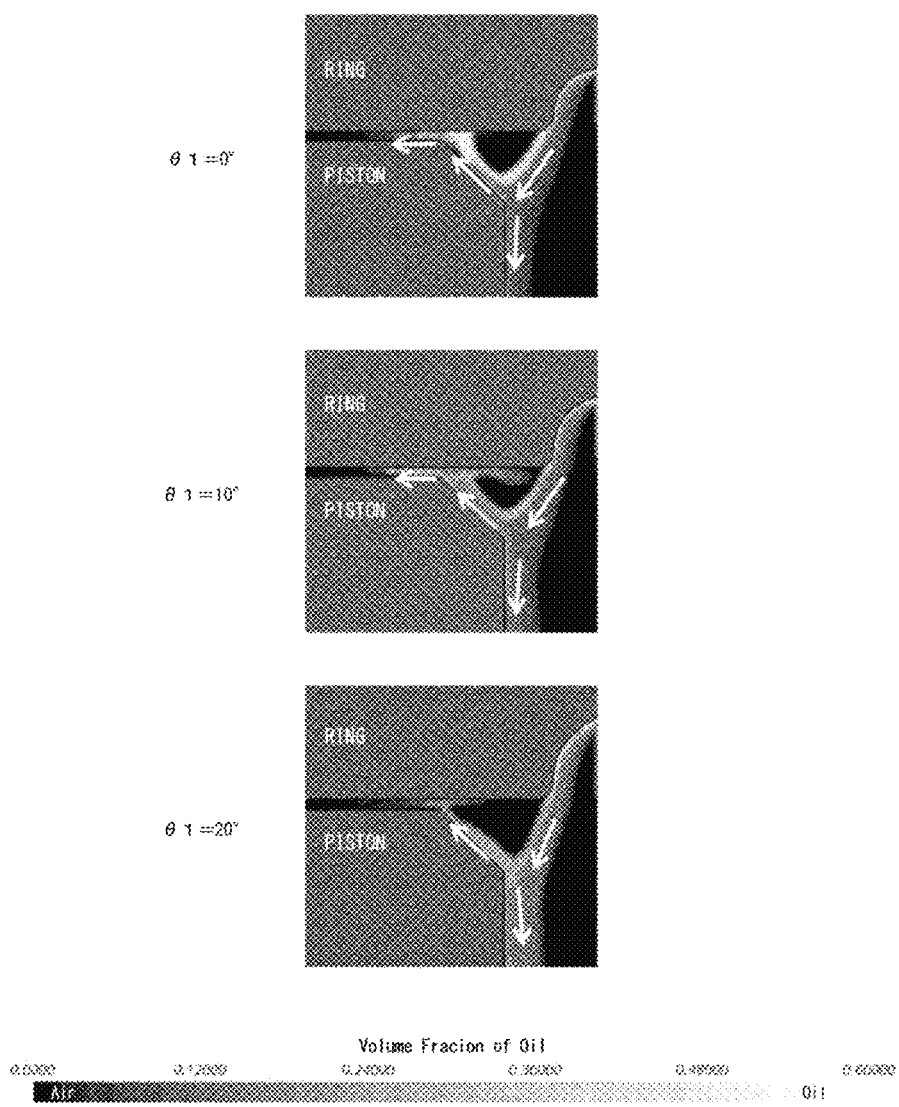
FIG. 11 is a view (1) indicating an analysis result of oil flow distribution near the second ring of the internal combustion in the descending stroke of the piston.
Figure 12:
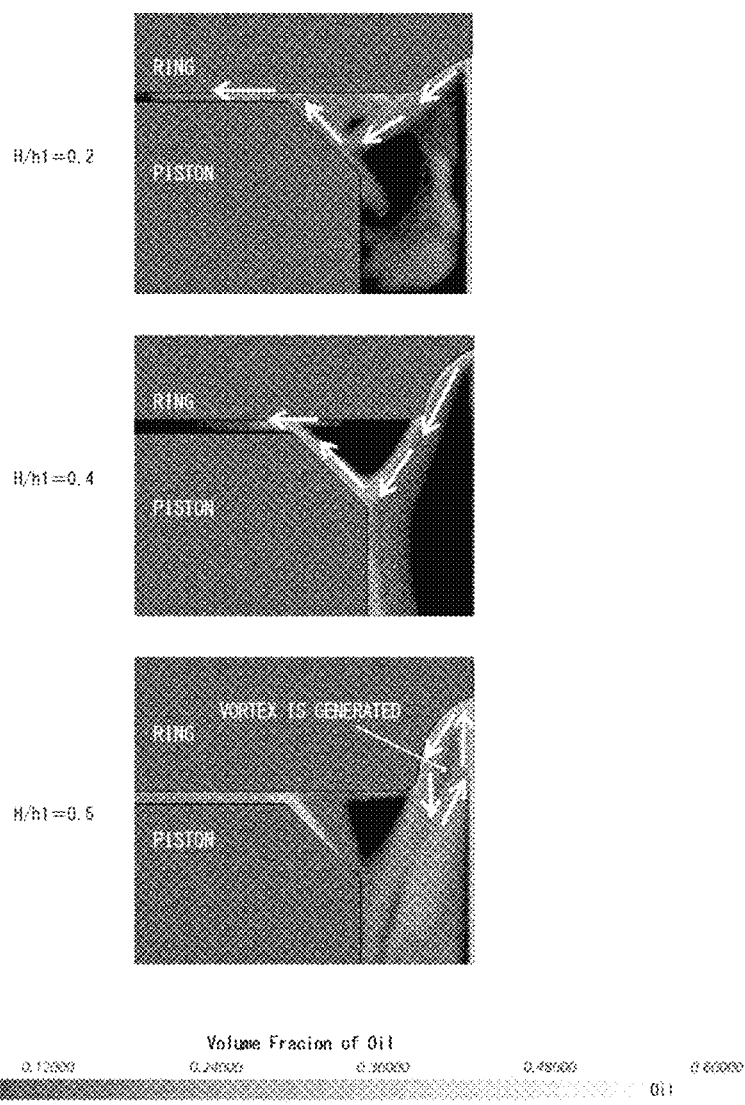
FIG. 12 is a view (2) indicating the analysis result of the oil flow distribution near the second ring of the internal combustion in the descending stroke of the piston.

Flow of oil in a case where the second ring according to the embodiment was used was analyzed using analysis software. FIG. 11 to FIG. 13 are views illustrating analysis results of oil flow distribution near the second ring of the internal combustion in the descending stroke of the piston. FIG. 11 to FIG. 13 indicate volume fraction of oil with gradation scale of "Volume Fraction of Oil". In the analysis results in FIG. 11 to FIG. 13, a black portion indicates a low ratio of oil (much air), a white portion indicates a high ratio of oil (much oil). Further, a white arrow in FIG. 11 to FIG. 13 indicates a direction in which oil flows.

FIG. 11 indicates flow distribution in each case where θ1=0°, θ1=10°, and θ1=20°. As indicated in FIG. 11, the amount of oil flowing out between the lower surface of the second ring and the lower wall surface of the ring groove is smaller in a case where θ1=10° and θ1=20° than in a case where θ1=0°. As indicated in FIG. 11, it can be seen that the amount of oil flowing out between the lower surface of the second ring and the lower wall surface of the ring groove is reduced in a case where θ1=10° and θ1=20° compared to a case where θ1=0°.

FIG. 12 indicates flow distribution in each case where H/h1=0.2, H/h1=0.4 and H/h1=0.5. As indicated in FIG. 12, it can be seen that in a case where H/h1=0.5, vortex of oil is generated, and as a result of the amount of oil hitting against the chamfered portion of the piston increasing, the amount of oil flowing out between the lower surface of the second ring and the lower wall surface of the ring groove increases.

FIG. 13 indicates flow distribution in each of the above-described comparative example, example 1 and example 2. As indicated in FIG. 13, it can be seen that the amount of oil flowing out between the lower surface of the second ring and the lower wall surface of the ring groove is smaller in the example 1 and the example 2 than in the comparative example.

While the preferred embodiment of the present invention has been described above, the above-described various forms can be combined in every possible manner. Note that while a target to which the present invention is to be applied is not particularly limited, the piston ring according to the present invention can be preferably applied to a spark ignition engine exemplified by a gasoline engine among the internal combustion. However, the piston ring according to the present invention may be applied to a compression ignition engine exemplified by a diesel engine. Further, in a case where the piston ring according to the present invention is applied to a spark ignition engine as the second ring, as illustrated in FIG. 1, an outer peripheral shape of the top ring is preferably formed in a barrel shape, and an outer peripheral shape of the segment of the oil ring is preferably formed in a barrel shape. This can secure gas seal performance and oil seal performance while preventing increase of friction. Note that the "barrel shape" refers to an outer peripheral shape curved so as to be convex outward in the radial direction while including a peak portion that has a maximum diameter in the piston ring and includes a symmetric barrel shape in which the peak portion is located at the vertical center and an eccentric barrel shape in which the peak portion is offset either upward or downward from the vertical center.

REFERENCE SIGNS LIST

1: outer peripheral surface
1a: outer peripheral end portion
12: cut surface
121: curved concave surface
122: lower R surface
2: inner peripheral surface
3: upper surface
4: lower surface
5: cutout portion
6: hard coating
10: cylinder
20: piston
40: second ring (example of piston ring)
100: internal combustion

The invention claimed is:

1. A piston ring to be loaded to a piston of an internal combustion, the piston ring comprising:
    an outer peripheral surface provided on an outer periphery of the piston ring; an inner peripheral surface provided on an inner periphery of the piston ring; an upper surface facing a combustion chamber side in the internal combustion among axial direction end surfaces of the piston ring; and a lower surface located on a crankcase side in the internal combustion among the axial direction end surfaces of the piston ring, wherein
    the outer peripheral surface includes, on a cross-section orthogonal to a peripherally longitudinal direction of the piston ring, an outer peripheral end surface including an outer peripheral end portion that has a maximum diameter in the piston ring, and a cut surface that connects the outer peripheral end surface and the lower surface so as to form a cutout portion extending in the peripherally longitudinal direction of the piston ring between the outer peripheral end surface and the lower surface,
    the cut surface includes a curved concave surface curved in a concave shape so as to approach a central axis of the piston ring toward the crankcase side,
    on the cross-section orthogonal to the peripherally longitudinal direction of the piston ring, an inclination angle of a tangent of the curved concave surface at a point located closest to the combustion chamber side on the curved concave surface, with respect to a first virtual line extending in parallel to the lower surface is equal to or greater than 5° and equal to or less than 50°, and
    in a case where an axial direction width of the piston ring is set as h1, and an axial direction width of the cut surface is set as H, H/h1 is equal to or greater than 0.2 and equal to or less than 0.4.

2. The piston ring according to claim 1, wherein in a case where a length of the cut surface in a radial direction of the piston ring is set as D, 0.2 mm≤D≤0.6 mm.

3. The piston ring according to claim 1, wherein on the cross-section orthogonal to the peripherally longitudinal direction of the piston ring, a curvature radius of the curved concave surface is constant over an entire region of the curved concave surface.

4. The piston ring according to claim 1, wherein a hard coating including at least one layer among a PVD processing coating, a DLC coating, a chrome plating processing coating, a nitridation processing coating, a chemical conversion processing coating, a resin coating, an oxidation processing coating, a Ni—P plating processing coating and a coated film is formed on the outer peripheral surface.

5. The piston ring according to claim 1, wherein
    the cut surface further includes a lower R surface that connects the curved concave surface and the lower surface, and
    a curvature radius of the lower R surface is equal to or greater than 0.01 mm and equal to or less than 0.2 mm.

6. The piston ring according to claim 1, wherein in an internal combustion in which a plurality of compression rings are loaded to the piston, the piston ring is formed as a second ring to be loaded at a second position from the combustion chamber side among the plurality of compression rings.

* * * * *